(12) United States Patent
Roodenburg et al.

(10) Patent No.: US 6,966,106 B1
(45) Date of Patent: Nov. 22, 2005

(54) METHOD AND APPARATUS FOR TRANSPORTING AND RUNNING TUBULARS

(75) Inventors: Joop Roodenburg, Delft (NL); Diederick Bernardus Wijning, Schiedam (NL)

(73) Assignee: ITREC B.V., (NL)

( * ) Notice: Subject to any disclaimer, the term of this patent is extended or adjusted under 35 U.S.C. 154(b) by 161 days.

(21) Appl. No.: 10/341,926

(22) Filed: Jan. 13, 2003

Related U.S. Application Data

(60) Provisional application No. 60/348,664, filed on Jan. 14, 2002.

(51) Int. Cl.[7] .............................................. E21B 19/14
(52) U.S. Cl. .............................. 29/407.01; 29/407.05; 29/407.09; 29/407.1; 166/75.11; 414/22.51; 414/22.54; 414/22.62; 414/22.63; 414/267; 211/70.4
(58) Field of Search ....................... 29/407.01, 407.05, 29/407.09, 407.1; 166/75.11, 77.1, 78.1; 414/22.51, 22.52, 22.54, 22.58, 22.62, 22.63, 414/22.65, 22.66, 22.69, 22.71, 267, 332; 211/70.4

(56) References Cited

U.S. PATENT DOCUMENTS

| | | | | |
|---|---|---|---|---|
| 3,116,793 A | | 1/1964 | McStravick ................... 166/21 |
| 3,157,424 A | * | 11/1964 | Hall ........................... 294/68.3 |
| 3,501,027 A | * | 3/1970 | Dea et al. .................... 414/542 |
| 3,658,298 A | | 4/1972 | Moore ......................... 254/190 |
| 3,714,995 A | | 2/1973 | Hanes .......................... 175/5 |
| 3,791,628 A | | 2/1974 | Burns .......................... 254/172 |
| 3,804,183 A | | 4/1974 | Duncan ......................... 175/5 |
| 3,841,407 A | | 10/1974 | Bozeman .................... 166/315 |
| 3,917,230 A | | 11/1975 | Barron ......................... 254/173 |
| 3,945,497 A | * | 3/1976 | Greenberg ................. 211/70.4 |
| 4,249,600 A | | 2/1981 | Bailey .......................... 166/77 |
| 4,336,840 A | | 6/1982 | Bailey .......................... 166/77 |
| 4,423,994 A | | 1/1984 | Schefers ....................... 414/22 |
| 4,515,220 A | | 5/1985 | Sizer ........................... 166/384 |
| 4,570,705 A | | 2/1986 | Walling ........................ 166/77 |
| 4,613,001 A | * | 9/1986 | Edberg et al. ................ 175/52 |
| 4,620,692 A | | 11/1986 | Foreman ..................... 254/277 |
| 4,688,764 A | | 8/1987 | Nayler ........................ 254/277 |
| 4,820,101 A | * | 4/1989 | Fenn ........................... 414/21 |
| 4,867,418 A | | 9/1989 | Daniels ....................... 254/277 |
| 5,183,122 A | * | 2/1993 | Rowbotham et al. ......... 175/52 |
| 5,188,503 A | * | 2/1993 | Appelberg ............... 414/745.1 |
| 5,291,956 A | | 3/1994 | Mueller ........................ 175/67 |
| 5,551,803 A | | 9/1996 | Pallini ..................... 405/223.1 |

(Continued)

FOREIGN PATENT DOCUMENTS

GB          2171974 A       3/1986      ........... B66C 13/04

(Continued)

*Primary Examiner*—Jermie E. Cozart
(74) *Attorney, Agent, or Firm*—Buskop Law Group, P.C.; Wendy Buskop

(57) ABSTRACT

The invention is a transporting apparatus for holding lengths of tubulars and transporting tubulars to a drill floor of a drill rig, wherein the transport container for tubulars has a bottom side, a two sides connected to the bottom side, and two ends connected to the bottom side and the sides, wherein there is at least two tubular supports for supporting a plurality of tubulars secured to the two sides adapted to support a row of tubulars and to act as a guide to allow the tubulars to be inserted upward or downward into the container, each support is made of at least two parallel upright members for slidingly receiving an end of a tubular and preventing horizontal movement of the tubulars perpendicular to the side and at least one connector is located on one end and a second connector is located on the other end.

12 Claims, 7 Drawing Sheets

U.S. PATENT DOCUMENTS

| | | | |
|---|---|---|---|
| 5,671,811 A | 9/1997 | Head | 166/346 |
| 5,839,514 A | 11/1998 | Gipson | 166/384 |
| 5,893,468 A * | 4/1999 | Holmes | 211/60.1 |
| 5,894,895 A | 4/1999 | Welsh | 175/5 |
| 6,009,216 A | 12/1999 | Pruett et al. | 385/12 |
| 6,065,540 A | 5/2000 | Thomeer et al. | 166/297 |
| 6,158,516 A | 12/2000 | Smith et al. | 166/385 |
| 6,179,065 B1 * | 1/2001 | Payne et al. | 175/24 |
| 6,237,703 B1 * | 5/2001 | Draney et al. | 175/162 |
| 6,273,188 B1 | 8/2001 | McCafferty et al. | 166/77.2 |
| 6,332,502 B1 * | 12/2001 | Mills et al. | 175/52 |
| 6,361,262 B1 | 3/2002 | Roodenburg | 414/22.51 |
| 6,398,457 B2 | 6/2002 | Baugh | 405/170 |
| 6,431,286 B1 | 8/2002 | Andreychuk | 166/384 |
| 6,471,075 B2 * | 10/2002 | Robichaux | 211/70.4 |
| 6,502,541 B2 | 1/2003 | Abo et al. | 414/22.51 |
| 6,554,075 B2 | 4/2003 | Fikes | 166/379 |
| 6,601,649 B2 | 8/2003 | Beato et al. | 166/352 |
| 2003/0010505 A1 | 1/2003 | Gipson | 166/384 |

FOREIGN PATENT DOCUMENTS

| | | | | |
|---|---|---|---|---|
| JP | 06305578 A | * | 11/1994 | B65G 63/00 |
| JP | 09136721 A | * | 5/1997 | B65G 57/18 |
| WO | PCT NO98/00342 | | 11/1998 | E21B 15/00 |

* cited by examiner

METHOD AND APPARATUS FOR TRANSPORTING AND RUNNING TUBULARS

The present application claims priority to Provisional Patent Application Ser. No. 60/348,664 filed in the U.S. Patent and Trademark Office on Jan. 14, 2002.

FIELD OF THE INVENTION

This invention relates to an apparatus and a method for transporting and running tubulars.

BACKGROUND OF THE INVENTION

Because of the very high costs associated with the rental and running of drilling rigs more and more effort is being expended on finding ways to reduce the time consumed by each operation. The present invention is concerned with transporting and running tubulars, for example drill pipe, casing or similar drilling components.

By way of example, during the construction of oil and gas wells a hole is drilled in the ground. Tubulars, such as casing, is then lowered down the hole and the annular space between the hole and the bore filled with cement. The tubulars like casing are heavy, difficult to transport and challenging to maneuver without harm to humans on the drill rig. There has long been needed to have a system, which improves the safety on a rig while handling tubulars.

Conventional tubulars, like casing are run by raising the traveling block of a drilling rig to near its highest position, swinging a length of casing into position below the traveling block, attaching the traveling block to the casing and lowering the casing into the hole. When the traveling block reaches the bottom of its travel, slips are applied to the casing to hold it in position. The traveling block is then disconnected from the casing, raised again to near its highest position and a new length of casing maneuvered into position, attached to the traveling block and screwed into the casing held in the slips.

The traveling block is then raised slightly to lift the entire casing string and allow the slips to be released and then lowered until the traveling block reaches the lowest position wherefore the slips are applied and the process repeated. This multi-step process is costly in time and not efficient.

In order to help overcome many of the problems with this process it has been proposed to provide a transportable container which can be formed into an assembly to hold tubulars in close proximity to the well center.

SUMMARY OF THE INVENTION

The invention relates to a transporting apparatus for holding lengths of tubulars and transporting tubulars to a drill floor of a drill rig, wherein the apparatus is a transport container for tubulars with a bottom side, two sides, and two ends. At least a first and a second tubular support supports a plurality of tubulars wherein each tubular support is secured to the sides. The tubular supports are adapted to support a row of tubulars and to act as a guide to allow the tubulars to be inserted upward or downward into the container. Each support comprises at least two parallel upright members for slidingly receiving an end of a tubular and preventing horizontal movement of the tubulars perpendicular to the first and second side. Finally, the apparatus has at least a first connector disposed on one end and a second connector disposed on the other end.

Multiple transporting apparatus can be connected to form a transport assembly that can be moved as a unit.

The invention relates to a method for moving a transporting apparatus that transfers tubulars to and from a drilling rig using a vehicle. The method uses the transporting apparatus described herein by placing the transporting apparatus on a vehicle, moving the vehicle to the drilling rig, and horizontally lifting the transporting apparatus onto the drilling rig.

Another aspect of the present invention provides a method for running tubulars using an apparatus in accordance with the present invention, characterized in that the method comprises the steps of repeatedly dispensing tubulars from a container and replenishing the container while the apparatus remains in close proximity to the well center.

Further, the invention has been designed to provide a method for handling pipe, which saves human lives on drilling rigs. Many accidents occur on rigs from human handling of tubulars and the invention provides a method and device so no human needs to handle tubulars.

The invention also contemplates a method for installing tubing into a well by placing at least one tubular in a first container and placing at least one tubular in a second container. The first and second containers are transported to a drilling rig where they are stored. The containers are removed from storage on the drilling rig. The first and second containers are connected together with a plurality of connectors making a container assembly. The container assembly is connected with the tubulars to a vertical position and then the individual connected tubulars are removed from the container assembly before the container assembly is returned to the rig for storage.

The present invention further contemplates a tracking system for tubulars from a manufacturing site. Each tubular is measured and given an identification number. Identified tubulars are placed into a numbered container with a file. Numbered containers are transported to a rig. Logistic controllers on the rig receive the file and designate the location of each numbered container on the rig. Two numbered containers are connected together. Connected numbered containers are lifted to a vertical position. Tubulars with an identification number are then selected for use on the rig.

BRIEF DESCRIPTION OF THE DRAWINGS

A specific embodiment of the invention will be described by way of example with reference to the accompanying drawings, in which.

DETAILED DESCRIPTION OF THE INVENTION

Figure 1:
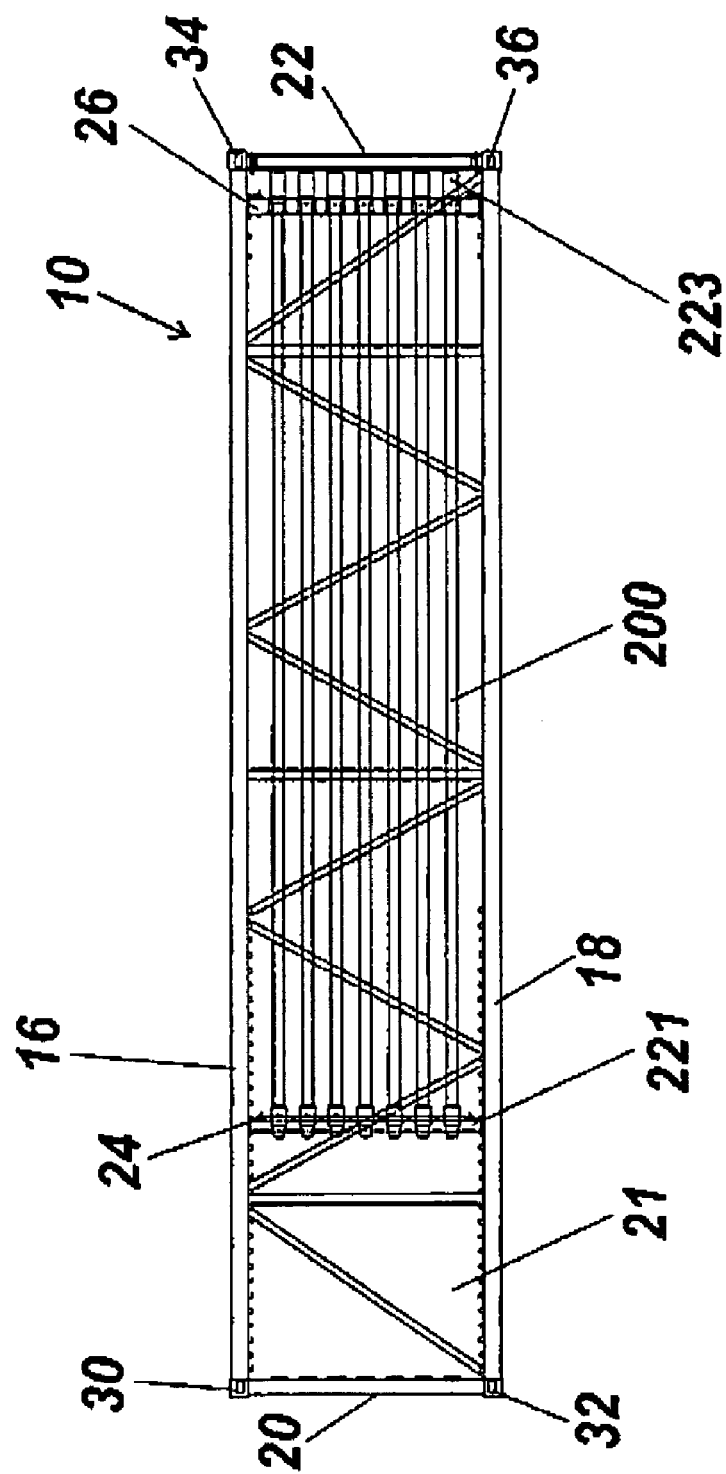
FIG. 1 is a top view of a single container of the invention.

According to one aspect of the present invention there is provided a transporting apparatus for holding lengths of tubulars and transporting tubulars to a drill floor of a drill rig. In the most preferred embodiment, this apparatus comprises:

a transport container for tubulars. This container has and open top, a bottom side, a first side and a second side connected to the bottom, a first end and a second end connected to the bottom side and the first and second side.

Multiple tubular supports for supporting a plurality of tubulars are placed in the container. These supports are preferably movable and removable. In the preferred embodiment, two supports are used.

Each tubular support is secured to the first side and the second side. Each tubular support is adapted to support a row of tubulars and to act as a guide to allow the tubulars to be inserted upward or downward into the container.

Each tubular support comprises at least two parallel upright members for slidingly receiving an end of a tubular and preventing horizontal movement of the tubulars perpendicular to the first and second side.

At least two connectors are used on the container. In the two connector embodiment, a first connector is disposed on the first end and a second connector is disposed on the second end. However, four connectors, one on each corner of the container are a preferred embodiment. More connectors, such as eight can be used within the scope of the invention.

The container is a transportable device to store and supply tubulars. In one embodiment, it is contemplated that the container can be refilled.

The container may be of any convenient shape, with rectangular being currently being a preferred shape. Square shapes or even modified angular shapes could be used, as long as the tubulars can fit within the container.

The container may be designed to hold the tubulars in a substantially horizontal plane with the tubulars essentially parallel to each other, such as with a lock. However, it may be preferred to design the container so that the tubulars can be angled outwardly or tilted for ease of use.

In one embodiment, the container is provided which can accommodate tubulars and be independently pivoted. In a preferred embodiment the entire container may be mounted to a mount for enabling the container to experience a tilting movement about a horizontal axis of the container.

Preferably, the containers have means to accommodate tubulars of different diameters when the container is in horizontal position and when the container is in vertical position. Typically the diameter range for the tubulars will be from 3.5 inches to 30 inches in diameter. The length of the tubulars can vary from 2 to 50 feet. The amount of tubulars in a container can range from simply one per container to up to 50 tubulars, such as casing or drill pipe per container.

Advantageously, the tubulars can be clamped into the container or locked into the container so that the container can be used in a vertical or horizontal position to the tubulars, or at an angle to those planes.

The tubulars can be passively clamped or actively clamped into the container and the clamp mechanism can preferably comprising pneumatic or hydraulic cylinders.

To lift the containers into a vertical position, or to tilt the container, a crane or a hydraulic lifting device on the rig can be used.

The present invention also provides a drilling rig having a drilling platform having a hole or moon pool, to allow casing to be lowered there through, characterized in that the drilling rig is provided with an apparatus in accordance with the present invention which is located proximate the hole.

Preferably, the drilling rig also includes a storage area for storing tubulars. The storage area may be above, below or at the same level as the drilling platform.

Another aspect of the present invention provides a method for running tubulars using an apparatus in accordance with the present invention, characterized in that the method comprises the steps of repeatedly dispensing tubulars from the container and replenishing the container while the apparatus remains in close proximity to the well center.

In one embodiment the tubulars are dispensed to a string of tubulars being run into a well bore of a subsea well.

In another embodiment the tubulars are dispensed from the container to a tubular storage area on the drill rig, such as a pipe rack.

FIG. 1 is a top view of the invention, which shows a first container 10 which can accommodate one or more lengths of tubulars, such as casing. The container 10 is used to provide a reliable supply of casing to make-up the casing string or tubulars, or other equipment for use in drilling exploration or production.

In this Figure, the first container 10 is open at the top for loading tubulars, and further has a bottom side 21 which can be open or of a plate construction, connected to a first side 16 which can be open or a plate. It also has a first end 20, a second side 18, and a second end 22. The second end 22 can be an open type construction or a solid plate.

Additionally, the first end 20 can be open, with support sides, or be a plate. Similarly, second side 18 can be open or a plate and a second end 22 can be open or a plate. The plate can vary between ½ inch in thickness and 2 inches in thickness. In a preferred embodiment, the plate or support material can be steel.

A tubular support 24 can be disposed between the first side 16 and the second side 18 for added support. Two tubular supports can be used. Optional additional tubular supports can be added at each end of the container. A second tubular support 26 is shown located at second end 22.

Each container 10 can have four connectors attached to each end of the container for lifting and locking containers together. In this top view of FIG. 1, four connectors of the eight total of the preferred embodiment are shown. These connectors are connectors 30, 32, 34 and 36. It is contemplated that only 2 connectors can be used on each end, or that additional connectors and lifting pad eyes can be secured on the sides of the container to facilitate the transport and moving of the tubulars. Drill pipe is shown in FIG. 1 as element 200. Drill pipe 200 has first coupling 221 and a second coupling 223.

Figure 2:
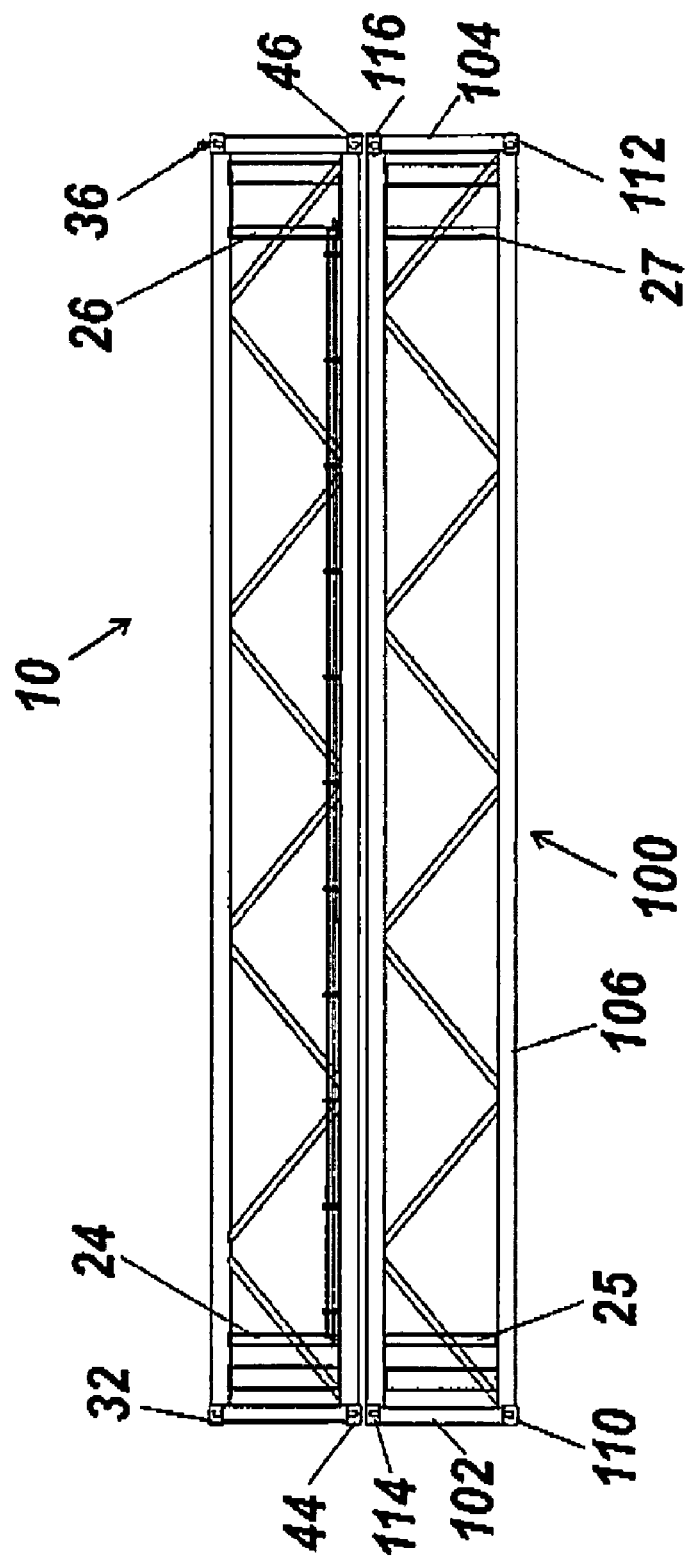
FIG. 2 is a side view of two single containers loaded together.

FIG. 2 is a side view of the invention, which shows first container 10 is disposed on top of a second container 100. In this view, each container has support tubulars. First container 10 has support tubulars 24 and 26. Second container 100 has support tubulars 25 and 27. Second container 100 also is shown having a first side 102 a second side 104, a bottom 106 with an open top. The second container also has connectors 110, 112, 114 and 116 are shown. The first container 10 has connectors 32, 36, 44 and 46. Connector 46 can latch and optionally lock, to secure connector 114 with connector 44, similarly connector 46 and connector 116 can engage.

Figure 3:
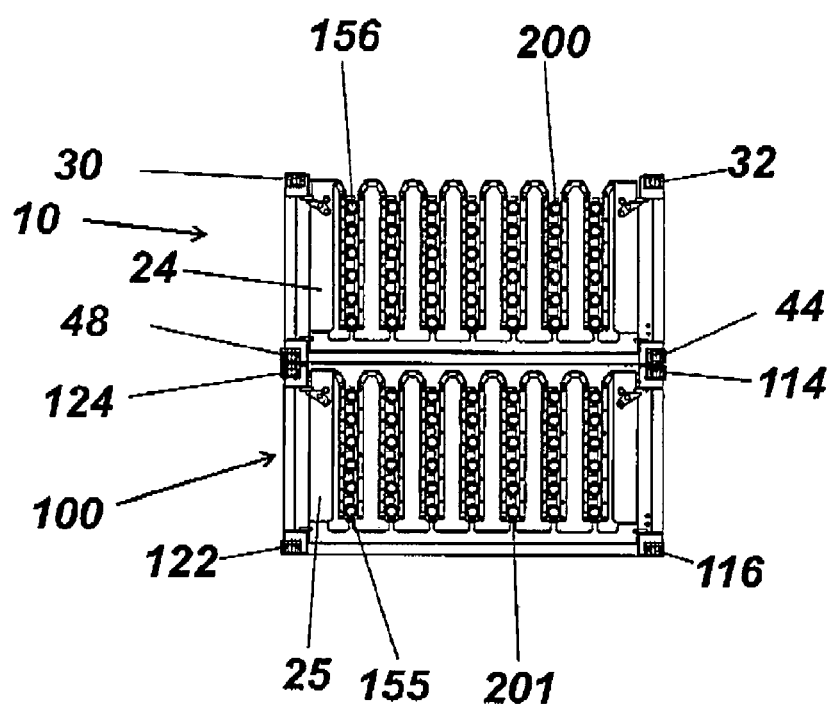
FIG. 3 is a front view of FIG. 2.

FIG. 3 is a front view of the invention of FIG. 2.

FIG. 3 shows the connectors of container 10, which are connectors 30, 32, 44 and 48. The connectors for container 100 are shown as well. These are connectors 114, 116, 122, and 124. Tubular support 24, which is part of container 10 and tubular support 25 that is part of container 100 are shown. Tubular support 24 is shown holding tubular 200 and tubular support 25 is holding tubular 201. Clamp 155, and 156 are shown attached to tubulars 24, and 25 and hold tubulars 200 and 201 in place.

Figure 4:
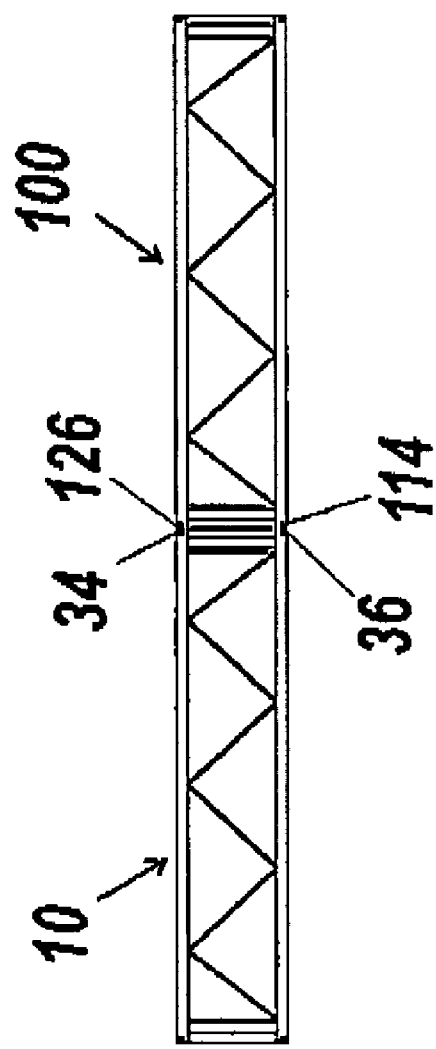
FIG. 4 is a top view of a coupled container assembly.

FIG. 4 is a top view of the invention showing the two containers 10 and 100 connected together laterally or lengthwise. In this embodiment connectors of container 10 engage four connectors of container 100 in a front to back relation (lengthwise relationship). In particular, connector 34 and 36 of container 10 engage connector 114 and connector 126.

Figure 5:
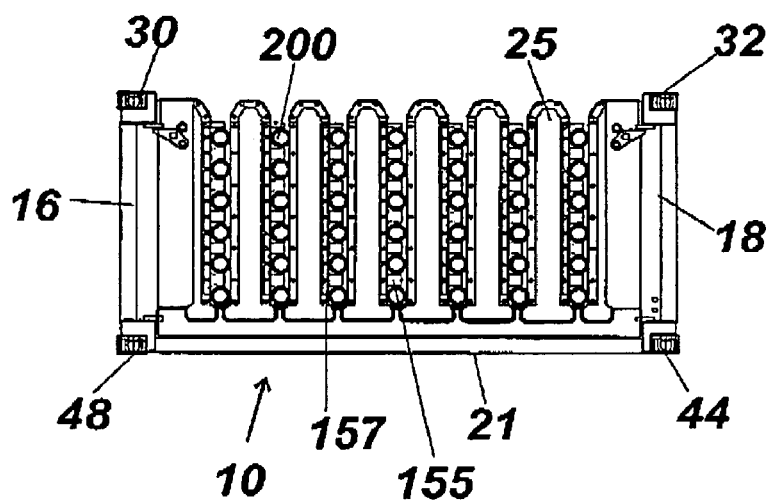
FIG. 5 is a side view of with tubular supports for holding tubulars in a container.

FIG. 5 is a side view of container 10 having tubular 200 disposed in the container. Tubular support 25 is shown having a clamp 155 for holding tubular 200. The clamp can be engaged with a hydraulic or pneumatic actuating cylinder 157. Connectors 30, 32, 44, 48 are shown disposed at each corner of container 10. The container 10 has sides 16, 18 and 21 for containing the tubulars.

Figure 6:
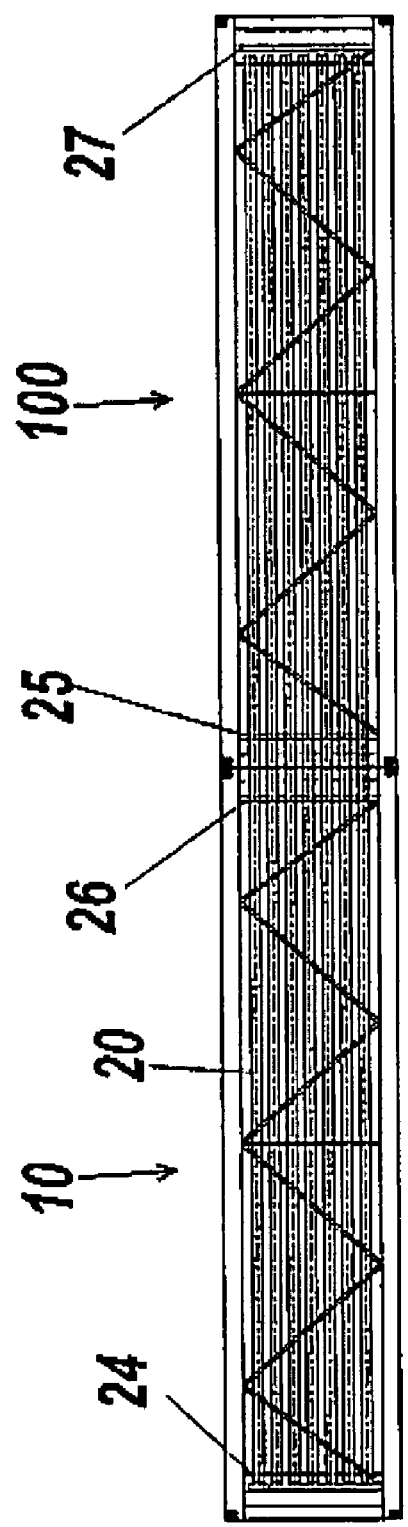
FIG. 6 is a top view of coupled tubulars in a coupled container assembly.

FIG. 6 is a top view of two coupled containers 10 and 100 connected lengthwise. The tubulars are disposed horizontally in the containers with the tubular supports 24, 25, 26, and 27.

The connectors can be twist connectors such as a type F 02 SK from Gerd Schulz of Hamburg Germany. Other types of lashing points and connectors are also contemplated as usable herein. Hooks are contemplated as usable in this invention.

The containers are designed to hold the tubulars in vertical, horizontal and tilted positions. Prior to transport to a rig, the tubulars such as casing are made up and checked on shore, in, for example 45 foot or 40 foot length containers. Transportation to the rig of the tubulars is done with the tubulars inside the containers. The advantages of handling the tubulars with this container are:

a. the tubulars are connected offshore on the rig while in the containers, thereby eliminating vertical stand building on the drill floor deck;
b. reduced number of crane moves on the rig;
c. one crane operator is sufficient to move the containers;
d. better utilization of maximum crane capacity;
e. reduced pollution risk due to construction of containers;
f. minimize manual intervention pipe handling operations, thereby reducing the number of possible accidents;
g. reduction of wear-and-tear on the drill pipes;
h. one lifting system is sufficient to handle a large variety of tubulars; and
i. during an emergency abandonment of the rig, the containers can be used to very quickly lay down casing or drill pipe, and thereby save time.

Figure 7:
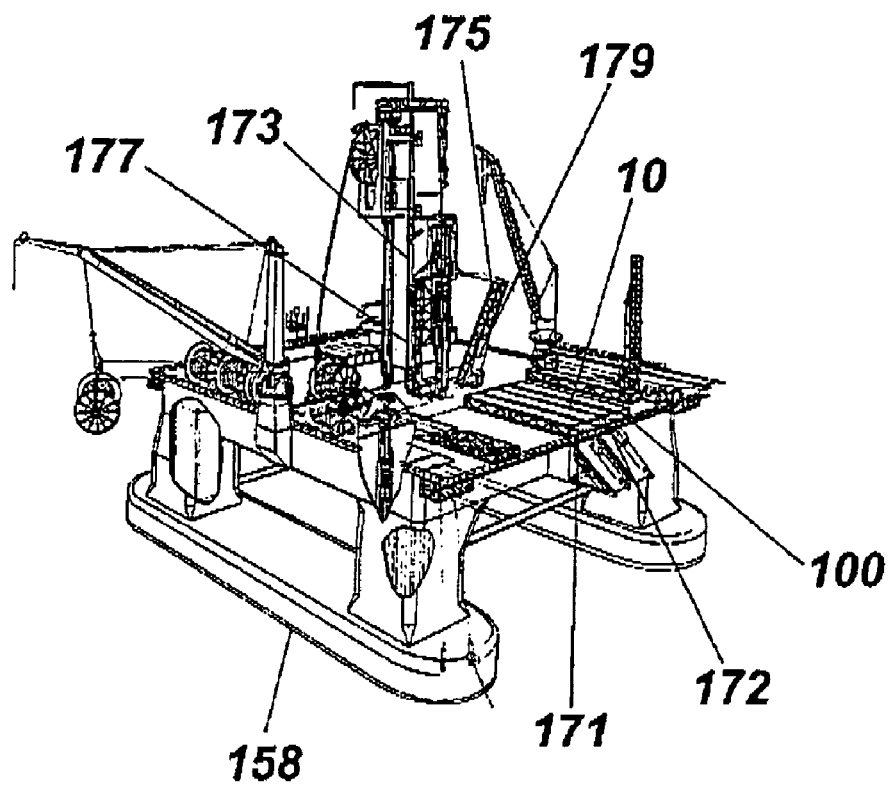
FIG. 7 is a perspective view of a coupled assembly lifted vertically on a rig.

FIG. 7 is a view of the container 10, 100, 171 and 172 on the drilling rig 158 in a horizontal position prior to lifting into a vertical position for use as described in the methods below. Containers 173 and 175 is shown in the vertical position and ready for use or storage according to the methods of the invention. A rotating table 177 for container 173 to lift the container is shown. A rotating table 179 for container 175 is shown for the same lifting step from the horizontal to the vertical position on the drilling rig.

This apparatus should make a significant saving in the overall time required to run casing or tubulars.

While the present invention can be used to facilitate in running tubulars, like casing it is contemplated that it will also be useful for running other tubular members, such as drill pipe and work strings, the latter usually requiring a fast reliable supply of tubular members.

While the preferred embodiment has been described in the context of providing tubulars to a well bore, the apparatus could equally be used for the temporary storage of tubulars being withdrawn from a well.

This invention has been designed to provide a method for handling pipe, which saves human lives on drilling rigs. Many accidents occur on rigs from human handling of tubulars and the invention provides a method and device so no human needs to handle tubulars.

A method of this invention involves using a transporting apparatus to transfer tubulars to and from a drilling rig, using a vehicle. In this method, the steps include loading tubular in a transporting apparatus, wherein the transporting apparatus comprises: a transport container for tubulars comprising: and open top, a bottom side; a first side and a second side connected to the bottom side; a first end and a second end connected to the bottom side and the first and second side, at least a first and a second tubular support for supporting a plurality of tubulars wherein each tubular support is secured to the first side and the second side of the container. In this method, it is preferred that the tubular supports are adapted to support a row of tubulars and to act as a guide to allow the tubulars to be inserted upward or downward into the container. Each support preferably comprises at least two parallel upright members for slidingly receiving an end of a tubular and preventing horizontal movement of the tubulars perpendicular to the first and second side. At least a first connector is disposed on the first end and a second connector is disposed on the second end. The next step involves placing the transporting apparatus on a vehicle, moving the vehicle to the drilling rig; and horizontally lifting the transporting apparatus onto the drilling rig.

Various vehicles include a barge, a workboat, a cargo ship, a container ship, and a moveable semisubmersible vessel or combinations of these.

The method can further involve the step of loading the transporting apparatus onto an intermediate vehicle, moving the intermediate vehicle to the vehicle and off-loading the transporting apparatus onto the vehicle. The intermediate vehicle can be a train, a truck, a dolly, a trailer, a barge, a workboat, a cargo ship, a container ship, and a moveable semisubmersible vessel, or combinations of these.

The method can optionally, further include the step of lifting the transporting apparatus from the horizontal position to a vertical position on the drill floor. In this position, it is contemplated that the tubulars can be stored on the drill floor in the vertical position.

The method may also involve the step of using at least two containers coupled using the connectors as the transporting apparatus. The two containers can be coupled such that the first container is disposed on top of the second container or the two containers can be coupled wherein the first container is coupled lengthwise to the second container.

Still another method involves providing a first oilfield tubular having a first coupling and an inner surface, and a second oilfield tubular having a second coupling and an inner surface; placing the first coupling of the first tubular adjacent to the second coupling of the second tubular; placing first and second couplings such that the tubulars are maintained in an accurately defined axially aligned position relative to each other and engaging the first coupling with the second coupling forming a joined tubular.

The container can be first disposed vertically, and then tilted to at least a 30 degree angle from the vertical, tubulars are then loaded into the container.

The containers for holding tubulars, which are usable in this invention, are typically, 20, 40, 42, 45, 48 50 and 56 foot long containers. The containers weigh at least 20 tons with payload, and weigh about 5 tons without payload.

The containers can be made from laminate, plate or pipes.

A passive or active locking mechanism can be used to hold the pipe in the container.

The transportable containers can be used to transport drill pipe, expandable casing, bottom hole assemblies, drill collars, completion pipe, and casing and combinations of these.

The invention involves a method for installing tubing into a well comprising the steps of: placing at least one tubular in a first container; placing at least one tubular in a second container; transporting the first and second containers containing tubulars to a drilling rig; storing the first and second containers on a drilling rig; removing the first and second containers from storage on the drilling rig; connecting the first and second containers together with a plurality of connectors making a container assembly, connecting a first tubular in the first container assembly to a second tubular in a second container; moving the container to the lifting positions; lifting the container assembly with the connected tubulars to a vertical position; removing individual connected tubulars from the container assembly; and lowering the container assembly to the rig for storage.

One embodiment has the first and second container connected forming a 40 foot transport assembly. In certain embodiments, the first container is coupled lengthwise to the second container using the connectors. Alternatively, in other embodiments, the first container can be coupled to the second container while the second container is on top of the first container.

Another embodiment has the first and second containers connected forming an 80 foot transport assembly.

A third embodiment has the first and second containers connected forming a 90 foot transport assembly.

The invention contemplates a tracking system for tubulars from a manufacturing site. Each tubular is measured and given an identification number. Identified tubulars are placed into a numbered container with a file. Numbered containers are transported to a rig. Logistic controllers on the rig receive the file and designate the location of each numbered container on the rig. Two numbered containers can be connected together. Connected numbered containers can be lifted to a vertical position and then tubulars with an identification number are then selected for use on the rig.

While only one embodiments of the invention have been disclosed in the above detailed description, the invention is not limited thereto but is susceptible to various changes without departing from the scope of the invention.

What is claimed is:

1. A method for moving a transporting apparatus that transfers tubulars to and from a drilling rig using a vehicle, comprising the steps of:
   a. loading tubulars in a transporting apparatus, wherein the transporting apparatus comprises:
      i. a transport container for tubulars comprising:
         1. a bottom side;
         2. a first side and a second side connected to the bottom side;
         3. a first end and a second end connected to the bottom side and the first and second side,
      ii. at least a first and a second tubular support for supporting a plurality of tubulars wherein each tubular support is secured to the first side and the second side wherein the tubular supports are adapted to support a row of tubulars and to act as a guide to allow the tubulars to be inserted upward or downward into the container and wherein each support comprises at least two parallel upright members for slidingly receiving an end of a tubular and preventing horizontal movement of the tubulars perpendicular to the first and second side; and
      iii. at least a first connector disposed on the first end and a second connector disposed on the second end;
   b. placing the transporting apparatus on a vehicle;
   c. moving the vehicle to the drilling rig; and
   d. lifting horizontally the transporting apparatus onto the drilling rig,
   e. lifting the transporting apparatus from the horizontal position to a vertical position on the floor of the drilling rig, wherein the tubulars are stored on the floor of the drilling rig in the vertical position.

2. The method of claim 1, wherein the vehicle is a member of the group consisting of a barge, a workboat, a cargo ship, a container ship, and a moveable semisubmersible vessel.

3. The method of claim 1, further comprising the step of loading the transporting apparatus onto an intermediate vehicle, moving the intermediate vehicle to the vehicle and off-loading the transporting apparatus onto the vehicle.

4. The method of claim 3, wherein the intermediate vehicle is a member of the group consisting of a train, a truck, a dolly, a trailer, a barge, a workboat, a cargo ship, a container ship, and a moveable semisubmersible vessel, and combinations thereof.

5. The method of claim 1, further comprising the step of using at least two containers coupled using the connectors as the transporting apparatus.

6. The method of claim 5, wherein the two containers are coupled wherein the first container is disposed on top of the second container.

7. The method of claim 5, wherein the two containers are coupled wherein the first container is coupled lengthwise to the second container.

8. The method of claim 7, further comprising the steps of:
   a. providing a first oil field tubular having a first coupling and an inner surface, and a second oilfield tubular having a second coupling and an inner surface;
   b. placing the first coupling of the first tubular adjacent to the second coupling of the second tubular; and
   c. placing first and second couplings such that the tubulars are maintained in an accurately defined axially aligned position relative to each other and engaging the first coupling with the second coupling forming a joined tubular.

9. The method of claim 1, wherein the container is first disposed vertically, then tilted to at least a 30 degree angle from the vertical, tubulars are then loaded into the container.

10. A method for running tubulars using a transporting apparatus, comprising the steps:
   a. inserting tubulars in a transporting apparatus wherein the transport apparatus comprises:
      i. a transport container for tubulars comprising:
         1. a bottom side;
         2. a first side and a second side connected to the bottom side;
         3. a first end and a second end connected to the bottom side and the first and second side,
      ii. at least a first and a second tubular support for supporting a plurality of tubulars wherein each tubular support is secured to the first side and the second side wherein the tubular supports are adapted to support a row of tubulars and to act as a guide to allow the tubulars to be inserted upward or downward into the container and wherein each support comprises at least two parallel upright members for slidingly receiving an end of a tubular and preventing horizontal movement of the tubulars perpendicular to the first and second side; and at least a first connector disposed on the first end and a second connector disposed on the second end, b. moving the transporting apparatus proximately close to a subsea well;

c. repeatedly dispensing tubulars from the transport apparatus in close proximity to the subsea well;

d. replenishing the supply of tubulars in the transport apparatus while the transport apparatus remains in close proximity to a subsea well.

11. A method for installing tubulars into a subsea well comprising the steps of:

a. placing at least one tubular in a first container;

b. placing at least one tubular in a second container;

c. transporting the first and second containers containing tubulars to a drilling rig;

d. storing the first and second containers on a drilling rig;

e. removing the first and second containers from storage on the drilling rig;

f. connecting the first and second containers together with a plurality of connectors making a container assembly;

g. connecting a first tubular in the first container to a second tubular in a second container;

h. lifting the container assembly with the connected tubulars to a vertical position;

i. removing individual connected tubulars from the container assembly; and j. lowering the container assembly to the rig for storage.

12. A method for tracking and delivering tubulars from a manufacturing site comprising the steps of:

a. measuring a tubular and giving the tubular an identification number;

b. placing identified tubulars into a numbered container with a file;

c. transporting numbered containers to a rig;

d. designating the location of each numbered container on the rig;

e. connecting together two numbered containers;

f. lifting connected numbered containers to a vertical position; and g. selecting tubulars with an identification number for use on the rig.

* * * * *